US012573958B2

(12) United States Patent
Fujiwara et al.

(10) Patent No.: US 12,573,958 B2
(45) Date of Patent: Mar. 10, 2026

(54) SCALABLE POWER SUPPLY SYSTEM

(71) Applicant: Murata Manufacturing Co., Ltd., Kyoto-fu (JP)

(72) Inventors: Yoshihiro Fujiwara, Nagaokakyo (JP); Tatsuya Hosotani, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 4 days.

(21) Appl. No.: 18/813,423

(22) Filed: Aug. 23, 2024

(65) Prior Publication Data

US 2024/0413755 A1     Dec. 12, 2024

Related U.S. Application Data

(63) Continuation of application No. PCT/JP2023/009643, filed on Mar. 13, 2023.

(30) Foreign Application Priority Data

Mar. 24, 2022     (JP) ................................. 2022-047721

(51) Int. Cl.
H02M 3/158          (2006.01)
H02M 1/00          (2006.01)
          (Continued)

(52) U.S. Cl.
CPC ....... H02M 3/1584 (2013.01); H02M 1/0022 (2021.05); H02M 1/32 (2013.01); H02M 3/157 (2013.01); H02M 3/1586 (2021.05)

(58) Field of Classification Search
CPC .. H02M 3/1584; H02M 1/0048; H02M 3/155; H02M 3/158; H02M 1/088;
          (Continued)

(56) References Cited

U.S. PATENT DOCUMENTS 6,031,361 A * 2/2000 Burstein ............... H02M 3/157
                                                          323/283
6,100,676 A * 8/2000 Burstein ............... H02M 3/157
                                                          323/283
(Continued)

FOREIGN PATENT DOCUMENTS

JP          2013-162586 A          8/2013
JP          2015-146711 A          8/2015
          (Continued)

OTHER PUBLICATIONS

International Search Report issued in PCT/JP2023/009643; mailed Apr. 11, 2023.

*Primary Examiner* — Yusef A Ahmed
(74) *Attorney, Agent, or Firm* — Studebaker Brackett PLLC

(57)          ABSTRACT

A signal extension circuit is electrically connected between an MPU and a drive circuit and outputs a second drive signal generated by adjusting a phase of a first drive signal. A low-voltage malfunction prevention circuit is connected between the input end of the drive circuit and the output ends of the MPU and the signal extension circuit. The first drive signal is a three-state signal having one of first, second and third voltages in ascending order. The low-voltage malfunction prevention circuit includes a detection comparison circuit that detects an output voltage and determines whether the output voltage is less than or equal to a threshold value representing a voltage value that is less than a predetermined output voltage. When the output voltage is less than the threshold value, the low-voltage malfunction prevention circuit outputs the first drive signal as the second drive signal to the drive circuit.

20 Claims, 10 Drawing Sheets

(51) Int. Cl.
  *H02M 1/32* (2007.01)
  *H02M 3/157* (2006.01)

(58) Field of Classification Search
  CPC ...... H02M 1/0022; H02M 1/32; H02M 3/157; H02M 3/1586
  See application file for complete search history.

(56) References Cited

U.S. PATENT DOCUMENTS

| | | | | |
|---|---|---|---|---|
| 6,268,716 B1* | 7/2001 | Burstein | H02M 3/1584 | |
| | | | 323/283 | |
| 6,574,124 B2* | 6/2003 | Lin | H02M 3/33569 | |
| | | | 363/72 | |
| 8,710,810 B1* | 4/2014 | McJimsey | H02M 3/158 | |
| | | | 323/283 | |
| 9,960,676 B1* | 5/2018 | Symonds | H02M 3/156 | |
| 10,381,918 B1* | 8/2019 | Stoichita et al. | H02M 1/15 | |
| 10,698,431 B2* | 6/2020 | Morroni | G05F 1/56 | |
| 11,228,248 B1* | 1/2022 | Zafarana | H03K 5/08 | |
| 11,329,556 B1* | 5/2022 | Yang | H02M 3/1584 | |
| 11,469,661 B2* | 10/2022 | King | H02J 7/0063 | |
| 12,388,355 B1* | 8/2025 | Shuai | H02M 1/007 | |
| 2004/0169499 A1* | 9/2004 | Huang | H02M 3/1584 | |
| | | | 323/272 | |
| 2008/0129259 A1* | 6/2008 | Endo | H02M 3/1584 | |
| | | | 323/272 | |
| 2010/0013306 A1* | 1/2010 | Heineman | H02J 1/001 | |
| | | | 307/32 | |
| 2011/0049986 A1* | 3/2011 | Edelson | H02M 3/158 | |
| | | | 307/31 | |
| 2011/0101940 A1* | 5/2011 | Kudo | H01L 24/37 | |
| | | | 323/282 | |
| 2011/0193515 A1* | 8/2011 | Wu | H02J 7/35 | |
| | | | 320/101 | |
| 2012/0086416 A1* | 4/2012 | Kudo | G06F 1/26 | |
| | | | 323/265 | |
| 2013/0051095 A1* | 2/2013 | Iwata | H02M 1/4225 | |
| | | | 363/81 | |

| | | | | |
|---|---|---|---|---|
| 2014/0191735 A1* | 7/2014 | Zhao | H02M 3/157 | |
| | | | 323/271 | |
| 2015/0115910 A1* | 4/2015 | Jiang | H02M 3/1584 | |
| | | | 323/271 | |
| 2015/0137598 A1* | 5/2015 | Hawawini | G01R 31/00 | |
| | | | 307/31 | |
| 2019/0181741 A1* | 6/2019 | Terada | H02M 3/158 | |
| 2021/0028686 A1* | 1/2021 | Jiang | H02M 3/1584 | |
| 2021/0028705 A1* | 1/2021 | Ishikura | H02M 3/1584 | |
| 2021/0288578 A1* | 9/2021 | Luo | H02M 1/088 | |
| 2021/0288580 A1* | 9/2021 | Luo | H02M 3/1584 | |
| 2021/0305908 A1* | 9/2021 | Kodera | H02M 7/062 | |
| 2021/0408913 A1* | 12/2021 | Yanagida | H02M 1/0025 | |
| 2021/0408914 A1* | 12/2021 | Hosotani | H02M 3/1586 | |
| 2021/0408916 A1* | 12/2021 | Sakamoto | H02M 1/0025 | |
| 2022/0069616 A1* | 3/2022 | Nakamori | H02J 9/062 | |
| 2022/0131467 A1* | 4/2022 | Hosotani | H02M 3/1586 | |
| 2023/0010809 A1* | 1/2023 | Sakamoto | H02M 1/0067 | |
| 2023/0016857 A1* | 1/2023 | Hosotani | H02M 1/0009 | |
| 2023/0238875 A1* | 7/2023 | Yang | H02M 3/1586 | |
| | | | 363/13 | |
| 2023/0327548 A1* | 10/2023 | Yun | H02M 1/0058 | |
| 2023/0361681 A1* | 11/2023 | Cheng | H02M 3/1584 | |
| 2023/0361683 A1* | 11/2023 | Hosotani | H02M 1/0025 | |
| 2024/0063720 A1* | 2/2024 | Yang | H02M 1/088 | |
| 2024/0088791 A1* | 3/2024 | Hosotani | H02M 3/1584 | |
| 2024/0195282 A1* | 6/2024 | Hosotani | H02M 3/1584 | |
| 2024/0243570 A1* | 7/2024 | Yoscovich | H02J 7/0029 | |
| 2024/0243604 A1* | 7/2024 | Yang | H02M 1/0083 | |
| 2024/0322710 A1* | 9/2024 | Tan | H02M 3/1586 | |
| 2024/0333159 A1* | 10/2024 | Kubota | H02M 3/158 | |
| 2024/0402785 A1* | 12/2024 | Nam | H02M 1/327 | |
| 2024/0413755 A1* | 12/2024 | Fujiwara | H02M 1/32 | |
| 2025/0116728 A1* | 4/2025 | Nischal | H02M 3/33576 | |
| 2025/0132682 A1* | 4/2025 | Tan | H02M 3/1586 | |
| 2025/0277873 A1* | 9/2025 | You | H02M 3/156 | |

FOREIGN PATENT DOCUMENTS

| | | |
|---|---|---|
| JP | 2015-226340 A | 12/2015 |
| JP | 2018-182783 A | 11/2018 |
| WO | 2015/037204 A1 | 3/2015 |

* cited by examiner

SCALABLE POWER SUPPLY SYSTEM

CROSS-REFERENCE TO RELATED APPLICATIONS

This application claims benefit of priority to International Patent Application No. PCT/JP2023/009643, filed Mar. 13, 2023, and to Japanese Patent Application No. 2022-047721, filed Mar. 24, 2022, the entire contents of each are incorporated herein by reference.

BACKGROUND

Technical Field

The present disclosure relates to a power supply system, particularly, a scalable power supply system, including multiple power converter circuits.

Background Art

Japanese Unexamined Patent Application Publication No. 2015-146711 describes a multiphase DC-DC converter. The multiphase DC-DC converter described in Japanese Unexamined Patent Application Publication No. 2015-146711 includes multiple delay circuits. The multiple delay circuits delay PWM drive signals output from a control circuit.

The control circuit and the multiple delay circuits supply PWM drive signals and delayed PWM drive signals to converter drive circuits connected downstream of the control circuit and the multiple delay circuits. This configuration enables scalable multiphase driving in which the number of power converter circuits can be set according to an output power specification.

SUMMARY

With the multiphase DC-DC converter (related-art power supply system) described in Japanese Unexamined Patent Application Publication No. 2015-146711, it is possible to achieve a scalable configuration by setting the number of power converter circuits without being limited by the number of PWM signals output by the control circuit. However, during a transient state at the start of the power supply system, because the period of the PWM signals varies greatly, it is difficult to achieve reliable communication between the control circuit and the converter drive circuits, and it is difficult to transition to a stable operation state, i.e., a steady state.

Therefore, the present disclosure provides a high-performance scalable power supply system that has a simple circuit configuration and excellent power conversion efficiency, can realize a scalable power converter circuit by setting the number of power converter circuits without being limited by the number of PWM signals output by a control circuit, can achieve more reliable communication between the control circuit (power management control IC device) and a converter drive circuit (drive circuit) in a transient state, and can achieve a stable transition of operation states from the transient state to a steady state.

A scalable power supply system according to the present disclosure includes multiple power converter circuits, an output terminal, a signal extension circuit, and a low-voltage malfunction prevention circuit. The multiple power converter circuits include at least a first power converter circuit including a first inductor, a first switching element that controls an electric current flowing through the first inductor, and a first drive circuit that drives the first switching element, and a second power converter circuit including a second inductor, a second switching element that controls an electric current flowing through the second inductor, and a second drive circuit that drives the second switching element. The multiple power converter circuits are connected in parallel with each other to the output terminal such that output currents from the multiple power converter circuits are combined to obtain an output voltage. The power management control IC device includes an external signal function that outputs a first drive signal controlled according to an external signal to the multiple power converter circuits.

The signal extension circuit is electrically connected between the power management control IC device and the second drive circuit and outputs a second drive signal generated by adjusting a phase of the first drive signal. The low-voltage malfunction prevention circuit is connected between an input end of the second drive circuit and output ends of the power management control IC device and the signal extension circuit. The first drive signal is a three-state signal having one of a first voltage, a second voltage, and a third voltage in ascending order. The low-voltage malfunction prevention circuit includes a detection comparison circuit that detects the output voltage and determines whether the output voltage is less than or equal to a threshold voltage representing a voltage value that is less than a predetermined output voltage.

When the output voltage is less than the threshold voltage, the low-voltage malfunction prevention circuit outputs the first drive signal as the second drive signal to the second drive circuit. When the output voltage is greater than the threshold voltage, the low-voltage malfunction prevention circuit outputs, to the second drive circuit, the second drive signal that is obtained by adjusting a phase of the first drive signal with the signal extension circuit. The multiple power converter circuits perform a multiphase signal driving operation.

With this configuration, in a transient state where the output voltage does not reach the threshold value, the power management control IC device is directly connected to the second drive circuit without going through the signal extension circuit. The power management control IC device and the first drive circuit are directly connected to each other both in the transient state and the steady state. With this configuration, communication is established between the power management control IC device and multiple drive circuits in the transient state. Furthermore, in the transient state, because the first drive signal is directly input to the second drive circuit as the second drive signal without passing through the signal extension circuit, a stable second drive signal is input to the second drive circuit without being influenced by the variation in the period of a PWM signal.

The present disclosure makes it possible to provide a high-performance scalable power supply system that has a simple circuit configuration and excellent power conversion efficiency, can realize a scalable power converter circuit by setting the number of power converter circuits without being limited by the number of PWM signals output by a control circuit, can achieve more reliable communication between a power management control IC device and a drive circuit in a transient state, and can achieve a stable transition of operation states from the transient state to a steady state.

DETAILED DESCRIPTION

In the present application, a scalable power supply system indicates a power supply system in which the number of power converter circuits used for multiphase driving can be set to a desired value. More specifically, a scalable power supply system refers to a power supply system in which the number of necessary power converter circuits can be properly set to efficiently achieve a desired output current value at an output voltage value determined according to command values (a drive voltage and a drive current) from a load, such as a CPU. In the descriptions below, a scalable power supply system is simply referred to as a power supply system.

First Embodiment

A power supply system according to a first embodiment of the present disclosure is described with reference to the drawings.

(Schematic Configuration of Power Supply System 100)

Figure 1:
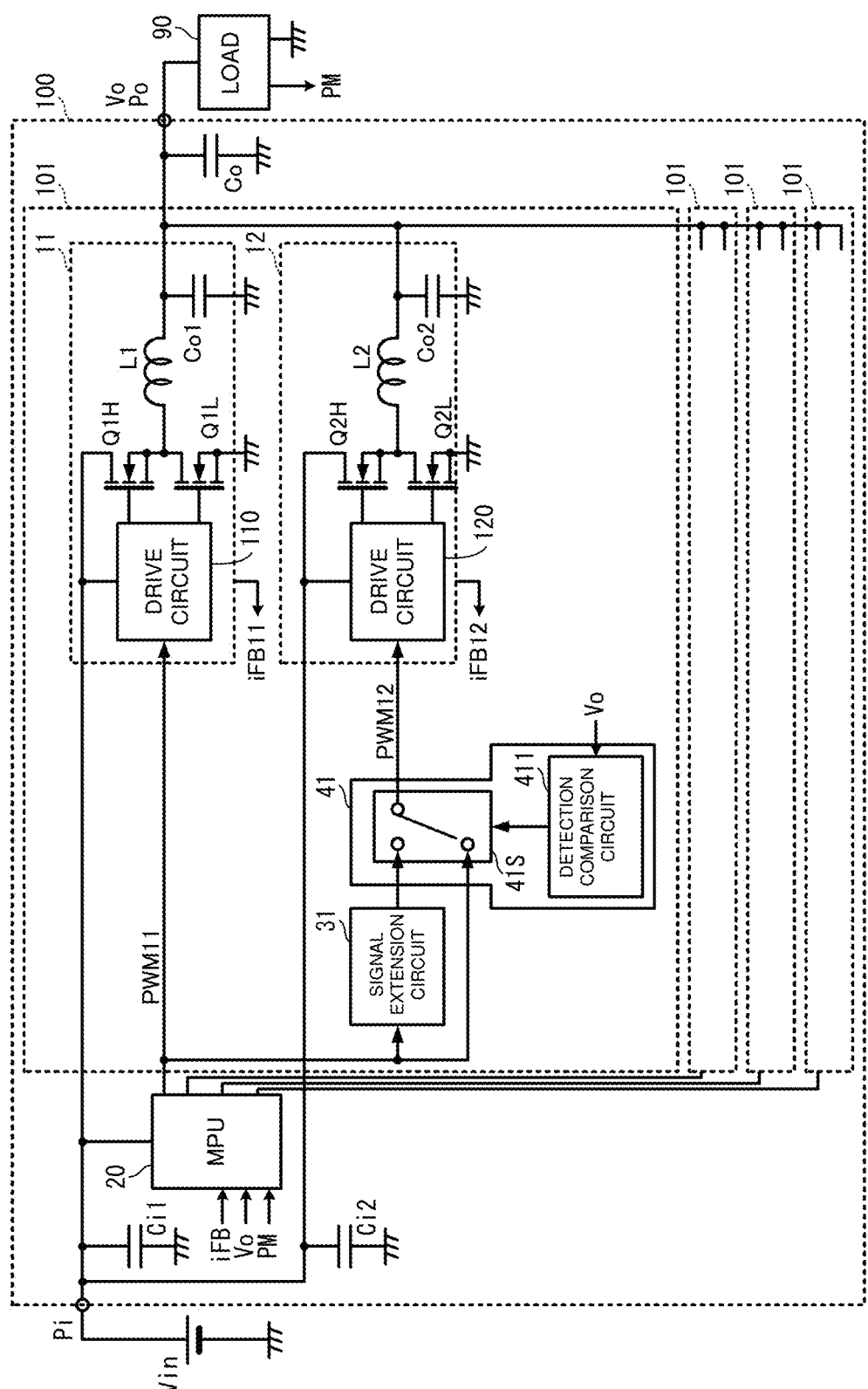
FIG. 1 is a circuit block diagram illustrating an example of a power supply system according to a first embodiment.

FIG. 1 is a circuit block diagram illustrating an example of the power supply system according to the first embodiment. As illustrated in FIG. 1, a power supply system 100 includes an MPU 20, multiple individual power conversion systems 101, an output capacitor Co, and input capacitors Ci. In the example of FIG. 1, four individual power conversion systems 101 are provided. However, the number of individual power conversion systems 101 is not limited to four.

The multiple individual power conversion systems 101 have the same configuration and are connected to the MPU 20, an input terminal Pi, and an output terminal Po in the same manner. Therefore, in FIG. 1, one of the individual power conversion systems 101 is illustrated in detail, and detailed illustration of the other individual power conversion systems 101 is omitted.

The power supply system 100 includes the input terminal Pi and the output terminal Po. The input terminal Pi is connected to an external direct current voltage source (or an input power supply). The power supply system 100 receives a direct current input voltage Vin via the input terminal Pi. The output terminal Po is connected to a load 90.

The load 90 is, for example, a processor, such as a CPU or a GPU, that can change power consumption according to a condition and includes a communication function. For example, the communication function enables communication according to a PMBus protocol. With this communication function, the load 90 communicates with the MPU 20 of the power supply system 100.

The MPU 20 is connected to the input terminal Pi and is provided with power via the input terminal Pi. In an actual configuration, a regulator is connected to the power supply input end of the MPU 20, and the MPU 20 is supplied with power via the regulator. A power supply line of the MPU 20 is connected to a ground reference potential via an input capacitor Ci1.

The MPU 20 is a programmable micro processing unit and is implemented by, for example, a semiconductor control IC that enables a multiphase driving operation. The MPU 20 corresponds to a "power management control IC device" of the present disclosure.

The MPU 20 includes a communication function. For example, the communication function enables communication according to a PMBus protocol. With the communication function, the MPU 20 communicates with the load 90 and performs a control process according to a communication result.

For example, a communication signal PM from the load 90 includes a drive voltage and a drive current. The MPU 20 determines the number of individual power conversion systems 101 to be driven and the specification of multiphase PWM control to stably supply the drive voltage and the drive current specified by the communication signal PM to the load 90. The MPU 20 generates PWM drive control signals for multiple individual power conversion systems 101 according to the determined PWM control.

The MPU 20 is connected to multiple individual power conversion systems 101. The MPU 20 outputs PWM drive control signals to the multiple individual power conversion systems 101.

Each of the multiple individual power conversion systems 101 is driven according to the PWM drive control signal from the MPU 20 and performs power conversion. The output ends of the multiple individual power conversion systems 101 are connected in parallel with each other to the output terminal Po. With this configuration, the output currents of the multiple individual power conversion systems 101 are combined at the output terminal Po and supplied to the load 90 as the output current of the power supply system 100. Also, with this configuration, the voltage at the output terminal Po becomes an output voltage Vo of the power supply system 100.

(Configuration of Individual Power Conversion System 101)

Each individual power conversion system 101 includes multiple power converter circuits 11 and 12 (a power converter circuit 11 and a power converter circuit 12), a signal extension circuit 31, and a low-voltage malfunction prevention circuit 41.

The multiple power converter circuits 11 and 12 are connected to the input terminal Pi and supplied with power via the input terminal Pi. A power supply line of the power converter circuit 11 is connected to the ground reference potential via the input capacitor Ci1. A power supply line of the power converter circuit 12 is connected to the ground reference potential via an input capacitor Ci2. The power converter circuit 11 corresponds to a "first power converter circuit" of the present disclosure, and the power converter circuit 12 corresponds to a "second power converter circuit" of the present disclosure.

The output end of the power converter circuit 11 and the output end of the power converter circuit 12 are connected to each other at a common output node and are connected to the output terminal Po via the common output node.

The multiple power converter circuits 11 and 12 individually and concurrently perform power conversion operations to convert the input voltage Vin to the output voltage Vo.

As illustrated in FIG. 1, the power converter circuit 11 includes a drive circuit 110, a switching element Q1H, a switching element Q1L, an inductor L1, and a capacitor Co1. For example, the drive circuit 110, the switching element Q1H, and the switching element Q1L are combined and integrated as an FET-embedded PWM control IC (analog circuit IC). The drive circuit 110 corresponds to a "first drive circuit" of the present disclosure, and the switching element Q1H and the switching element Q1L correspond to a "first switching element" of the present disclosure.

The drive circuit 110 is connected to the input terminal Pi and is supplied with power via the input terminal Pi. In the actual configuration, for example, a regulator is connected to the power supply input end of the drive circuit 110, and power is supplied via the regulator. The drive circuit 110 is connected to the MPU 20. The gate of the switching element Q1H and the gate of the switching element Q1L are connected to the drive circuit 110.

The drain of the switching element Q1H is connected to the input terminal Pi. The source of the switching element Q1H is connected to the drain of the switching element Q1L. The source of the switching element Q1L is connected to the ground reference potential. One end of the inductor L1 is connected to a node between the switching elements Q1H and Q1L. The other end of the inductor L1 is connected to the common output node. Also, the other end of the inductor L1 is connected to the ground reference potential via the capacitor Co1.

The power converter circuit 12 includes a drive circuit 120, a switching element Q2H, a switching element Q2L, an inductor L2, and a capacitor Co2. For example, the drive circuit 120, the switching element Q2H, and the switching element Q2L are combined and integrated as an FET-embedded PWM control IC (analog circuit IC). The drive circuit 120 corresponds to a "second drive circuit" of the present disclosure, and the switching elements Q2H and Q2L correspond to a "second switching element" of the present disclosure.

The drive circuit 120 is connected to the input terminal Pi and is supplied with power via the input terminal Pi. In the actual configuration, for example, a regulator is connected to the power supply input end of the drive circuit 120, and power is supplied via the regulator. The drive circuit 120 is connected to the MPU 20 via the signal extension circuit 31 and/or the low-voltage malfunction prevention circuit 41. The gate of the switching element Q2H and the gate of the switching element Q2L are connected to the drive circuit 120.

The drain of the switching element Q2H is connected to the input terminal Pi. The source of the switching element Q2H is connected to the drain of the switching element Q2L. The source of the switching element Q2L is connected to the ground reference potential. One end of the inductor L2 is connected to a node between the switching elements Q2H and Q2L. The other end of the inductor L2 is connected to the common output node. Also, the other end of the inductor L2 is connected to the ground reference potential via the capacitor Co2.

The input end of the signal extension circuit 31 is connected to a connection line between the MPU 20 and the power converter circuit 11. The output end of the signal extension circuit 31 is connected to the low-voltage malfunction prevention circuit 41.

The signal extension circuit 31 is implemented by an analog IC. That is, the signal extension circuit 31 is implemented by an analog delay circuit. This makes it possible to form the signal extension circuit 31 with a simple configuration at low cost.

The low-voltage malfunction prevention circuit 41 includes a switch circuit 41S and a detection comparison circuit 411. The switch circuit 41S is connected to the output end of the signal extension circuit 31, the connection line between the MPU 20 and the power converter circuit 11, and the drive circuit 120.

The detection comparison circuit 411 is implemented by, for example, a comparator. The output voltage Vo is input to the detection comparison circuit 411. A threshold value Vth, which represents a voltage value, is set in the detection comparison circuit 411. The threshold value Vth is set based on the drive voltage of the load 90 in the steady state. For example, the threshold value Vth is set to the drive voltage of the load 90 in the steady state. This setting is made by the communication signal PM received by the MPU 20.

The detection comparison circuit 411 generates a switch control signal PG corresponding to a result of comparison between the output voltage Vo and the threshold value Vth and outputs the switch control signal PG to the switch circuit 41S.

Figures 2A, 2B:
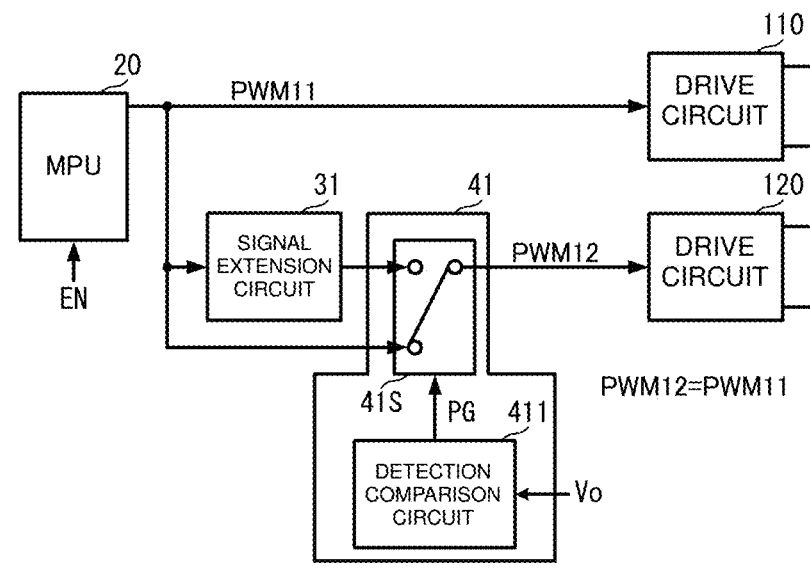
FIG. 2A illustrates connection among an MPU, a signal extension circuit, a low-voltage malfunction prevention circuit, and multiple drive circuits in a transient state.
FIG. 2B illustrates connection among the MPU, the signal extension circuit, the low-voltage malfunction prevention circuit, and the multiple drive circuits in a steady state.

FIG. 2A illustrates connection among the MPU, the signal extension circuit, the low-voltage malfunction prevention circuit, and the multiple drive circuits in the transient state; and FIG. 2B illustrates connection among the MPU, the signal extension circuit, the low-voltage malfunction prevention circuit, and the multiple drive circuits in the steady state.

When the output voltage Vo is less than the threshold value Vth (in the transient state), the detection comparison circuit 411 controls the switch circuit 41S using the switch control signal PG such that the connection line between MPU 20 and the power converter circuit 11 is electrically connected to the drive circuit 120 (see FIG. 2A).

When the output voltage is greater than the threshold value Vth or the output voltage is greater than or equal to the threshold value Vth (in the steady state), the detection comparison circuit 411 controls the switch circuit 41S using the switch control signal PG such that the output end of the signal extension circuit 31 is electrically connected to the drive circuit 120 (see FIG. 2B).

(Detailed Description of Power Conversion Control)

Figure 3:
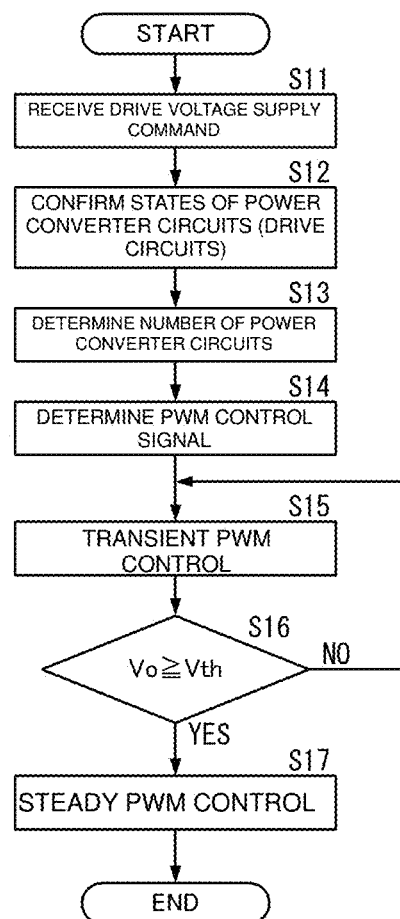
FIG. 3 is a flowchart schematically illustrating a control process performed by the power supply system according to the first embodiment.
Figure 4:
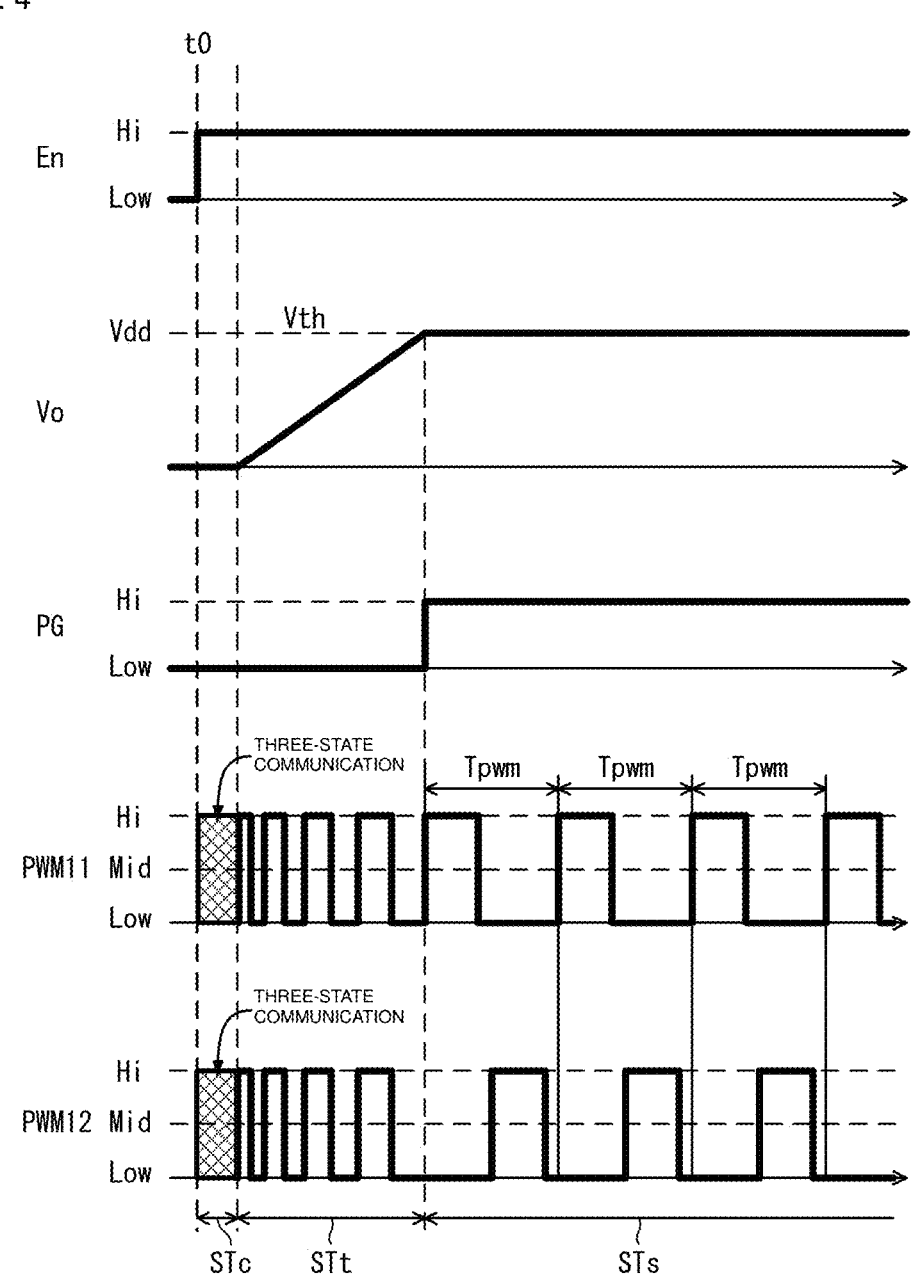
FIG. 4 is a diagram illustrating examples of waveforms in the power supply system according to the first embodiment.

FIG. 3 is a flowchart schematically illustrating a control process performed by the power supply system according to the first embodiment. FIG. 4 is a diagram illustrating examples of waveforms in the power supply system according to the first embodiment. FIG. 4 illustrates, from top to bottom, an enable signal En, the output voltage Vo, the switch control signal PG, a PWM drive control signal PWM11, and a PWM drive control signal PWM12. The PWM drive control signal PWM11 is input to the drive circuit 110, and the PWM drive control signal PWM12 is input to the drive circuit 120.

The MPU 20 of the power supply system 100 receives a drive voltage supply command from the load 90 (S11). This is performed using the enable signal En illustrated in FIG. 4. Specifically, the MPU 20 receives the drive voltage supply command from the load 90 by receiving a high-level enable signal En. As a result, the MPU 20 is started.

The MPU 20 analyzes the communication signal PM to determine the specification of multiphase PWM control (e.g., the number of individual power conversion systems 101 to be driven) based on the drive voltage and the drive current.

More specifically, the MPU 20 communicates with the drive circuit 110 of the power converter circuit 11 and the drive circuit 120 of the power converter circuit 12 to confirm the states of the power converter circuits 11 and 12 (the drive circuits 110 and 120) (S12). This communication is performed using three-state PWM signals, which are digital signals. A three-state PWM signal has three states including a low level (a first voltage), a mid level (a second voltage), and a high level (a third voltage), and communication is performed by combinations of these three levels. Using a three-state signal makes it possible to communicate more information than using a two-state signal. The period of this communication corresponds to a communication period STc for state confirmation illustrated in FIG. 4.

The MPU 20 determines the number of power converter circuits (the number of circuits) that can be driven based on communication results with the drive circuits 110 and 120 (S13), and determines PWM drive control signals according to the required drive current and the number of circuits (S14).

The MPU 20 performs PWM control in the transient state (S15). Specifically, the MPU 20 generates and outputs the PWM drive control signal PWM11 such that the output voltage Vo reaches a required drive voltage Vdd. In this step, the MPU 20 varies the PWM control period according to the output voltage Vo that is fed back.

At this stage, because the output voltage Vo is less than the threshold value Vth, the detection comparison circuit 411 outputs a low-level switch control signal PG to the switch circuit 41S. As a result of receiving the low-level switch control signal PG, the switch circuit 41S electrically connects the connection line between the MPU 20 and the power converter circuit 11 to the drive circuit 120. That is, the switch circuit 41S electrically connects the output end of the MPU 20 to the drive circuit 120.

As a result, in a transient state STt, the PWM drive control signal PWM12 input to the drive circuit 120 becomes the same as the PWM drive control signal PWM11. That is, the same PWM drive control signal is input to the drive circuits 110 and 120.

Until the output voltage Vo reaches the threshold value Vth (S16: NO), the MPU 20 performs the PWM control in the transient state (S15). Also, until the output voltage Vo reaches the threshold value Vth (S16: NO), the switch control signal PG is at the low level, and the switch circuit 41S electrically connects the output end of the MPU 20 to the drive circuit 120.

When the output voltage Vo reaches the threshold value Vth (S16: YES) as a result of continuing the above control, the operation state transitions to a steady state STs. In this example, the MPU 20 uses the threshold value Vth corresponding to the required drive voltage Vdd to perform PWM control in the steady state (S17). Specifically, the MPU 20 generates the PWM drive control signal PWM11 with a PWM period Tpwm according to the required drive voltage, the required drive current, and the number of individual power conversion systems 101 to be driven to achieve multiphase PWM control.

Also, in the steady state, because the output voltage Vo is greater than the threshold value Vth, the detection comparison circuit 411 outputs a high-level switch control signal PG to the switch circuit 41S. As a result of receiving the high-level switch control signal PG, the switch circuit 41S electrically disconnects the output end of the MPU 20 from the drive circuit 120 and electrically connects the output end of the signal extension circuit 31 to the drive circuit 120.

Accordingly, in the steady state, a PWM drive control signal output from the signal extension circuit 31 is input to the drive circuit 120. The signal extension circuit 31 is implemented by a delay circuit (or a phase adjustment circuit) as described above, delays the input PWM drive control signal PWM11 by a predetermined amount, and outputs the delayed PWM drive control signal PWM11. The amount of delay is determined based on the PWM period Tpwm and the number of circuits.

As a result, the PWM drive control signal PWM12 input to the drive circuit 120 becomes a signal that is delayed by a predetermined amount from the PWM drive control signal PWM11. Therefore, the multiple individual power conversion systems 101 are driven in a multiphase manner.

With this configuration, the power supply system 100 can efficiently achieve a desired output current value at an output voltage value determined based on command values (a drive voltage and a drive current) received from the load 90 by using an appropriate number of power converter circuits. That is, in the steady state, the power supply system 100 can suppress power consumption and can expand the output power capacity by flexibly responding to a current increase according to the number of power converter circuits to be driven.

Although detailed circuit configurations are omitted, after the transition to the steady state, the power converter circuit 11 detects an inductor current of the inductor L1 and feeds back the detected inductor current of the inductor L1 to the MPU 20 via an individual current feedback circuit iFB11. The power converter circuit 12 detects an inductor current of the inductor L2 and feeds back the detected inductor current of the inductor L2 to the MPU 20 via an individual current feedback circuit iFB12. Also, the output voltage Vo of the output terminal Po is fed back to the MPU 20.

The MPU 20 adjusts the PWM drive control signals using the fed-back currents and voltage. This makes it possible to adjust the output difference between the power converter circuit 11 and the power converter circuit 12 and the output differences among the multiple individual power conversion systems 101. Therefore, the power supply system 100 can achieve power conversion with even higher efficiency.

Furthermore, the power supply system 100 can more reliably achieve communication between the MPU 20 and the drive circuits 110 and 120 in the transient state. This enables the MPU 20 to more reliably determine the states of multiple individual power conversion systems 101 at startup and can achieve highly efficient power conversion described above.

Furthermore, in the power supply system 100, it is possible to supply appropriate PWM drive control signals to the drive circuits 110 and 120 in the transient state. This in turn makes it possible to stably start the power supply system 100.

Figure 5:
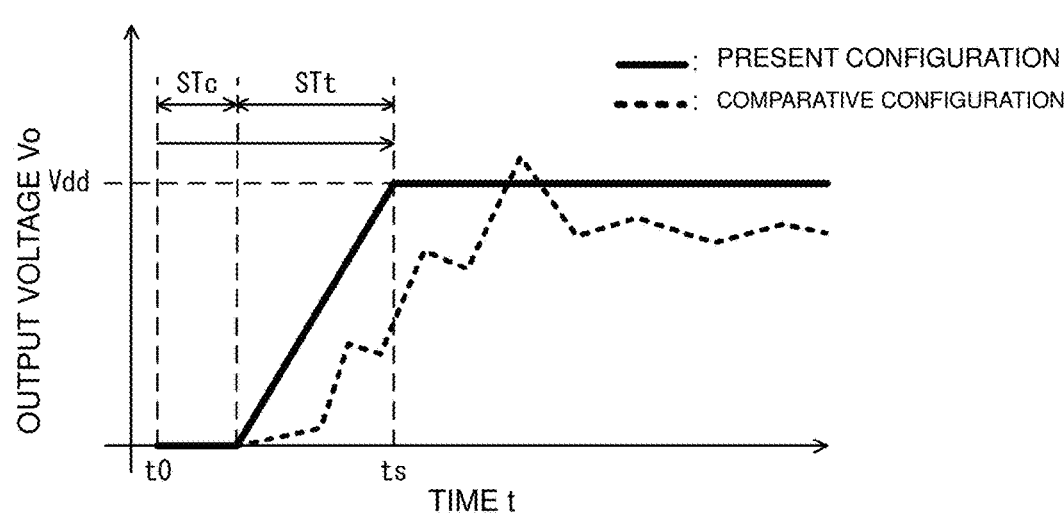
FIG. 5 is a diagram illustrating examples of output voltage waveforms in the present configuration and a comparative configuration.

FIG. 5 is a diagram illustrating examples of output voltage waveforms in the present configuration and a comparative configuration.

For example, without the configuration of the power supply system 100 (in the case of a comparative configuration), the PWM period becomes shorter and more greatly fluctuates in the transient state than in the steady state. Therefore, if the low-voltage malfunction prevention circuit 41 is not provided and the output end of the signal extension circuit 31 is electrically connected to the drive circuit 120 even in the transient state, the PWM drive control signal, which is to be input to the drive circuit 120, is input to the drive circuit 120 after the current PWM period passes. As a result, the startup state of the power supply system 100 becomes unstable. This leads to a problem that, as indicated by a dotted line in FIG. 5, the rise of the output voltage Vo becomes unstable, and the output voltage Vo does not reach the required drive voltage Vdd even after a predetermined time ts from a start time t0. This also leads to a problem that the output voltage Vo in the transient state does not increase monotonically at a substantially constant rate.

However, with the configuration of the power supply system 100, the output voltage Vo monotonically increases at a substantially constant rate in the transient state such that the output voltage Vo can reach the required drive voltage Vdd and the operation state can transition to the steady state at the predetermined time ts. Also, even after the transition to the steady state, a substantially constant output voltage Vo can be obtained.

Second Embodiment

Figure 6:
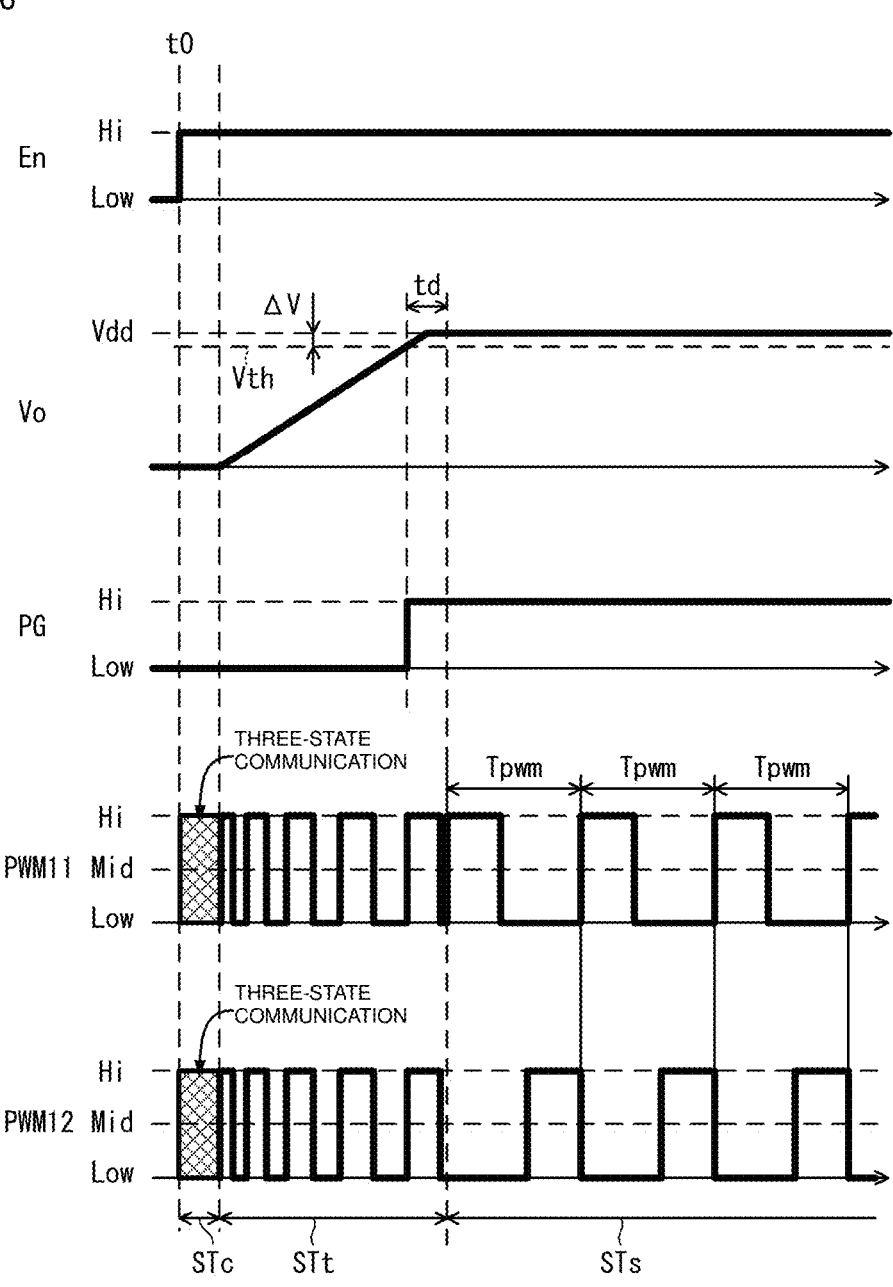
FIG. 6 is a diagram illustrating examples of waveforms in a power supply system according to a second embodiment.

A power supply system according to a second embodiment of the present disclosure is described with reference to the drawing. FIG. 6 is a diagram illustrating examples of waveforms in the power supply system according to the second embodiment. FIG. 6 illustrates, from top to bottom, an enable signal En, an output voltage Vo, a switch control signal PG, a PWM drive control signal PWM11, and a PWM drive control signal PWM12.

As indicated by FIG. 6, the power supply system according to the second embodiment differs from the power supply system 100 according to the first embodiment in the setting of the threshold value Vth and the timing at which the PWM control signals are transitioned from the transient state to the steady state. Other configurations and control methods of the power supply system according to the second embodiment are the same as those of the power supply system 100 according to the first embodiment, and the descriptions of the same configurations and control methods are omitted here.

The detection comparison circuit 411 and the MPU 20 use a threshold value Vth that is lower than the required drive voltage Vdd by a predetermined voltage ΔV The voltage ΔV is, for example, about 5% to 10% of the required drive voltage Vdd. However, the voltage ΔV is not limited to this example, and the voltage ΔV may be set to any appropriate percentage of the required drive voltage Vdd or may be set to a fixed value unrelated to the required drive voltage Vdd.

As described above, the detection comparison circuit 411 generates the switch control signal PG to control the switch circuit 41S based on a result of comparison between the output voltage Vo and the threshold value Vth.

When the output voltage Vo becomes greater than the threshold value Vth, the MPU 20 starts to count time for switching control. When the time for switching control reaches a time td, the MPU 20 switches PWM drive control signals in the transient state to PWM drive control signals in the steady state. The predetermined time td is determined based on the temporal variation characteristics of the output voltage Vo and the threshold value Vth and is set at a timing at which the output voltage Vo surely reaches the required drive voltage Vdd.

With the configuration and control described above, the power supply system according to the second embodiment can more effectively reduce malfunctions during the transition from the transient state to the stable state and can therefore be more stably started.

Third Embodiment

Figure 7:
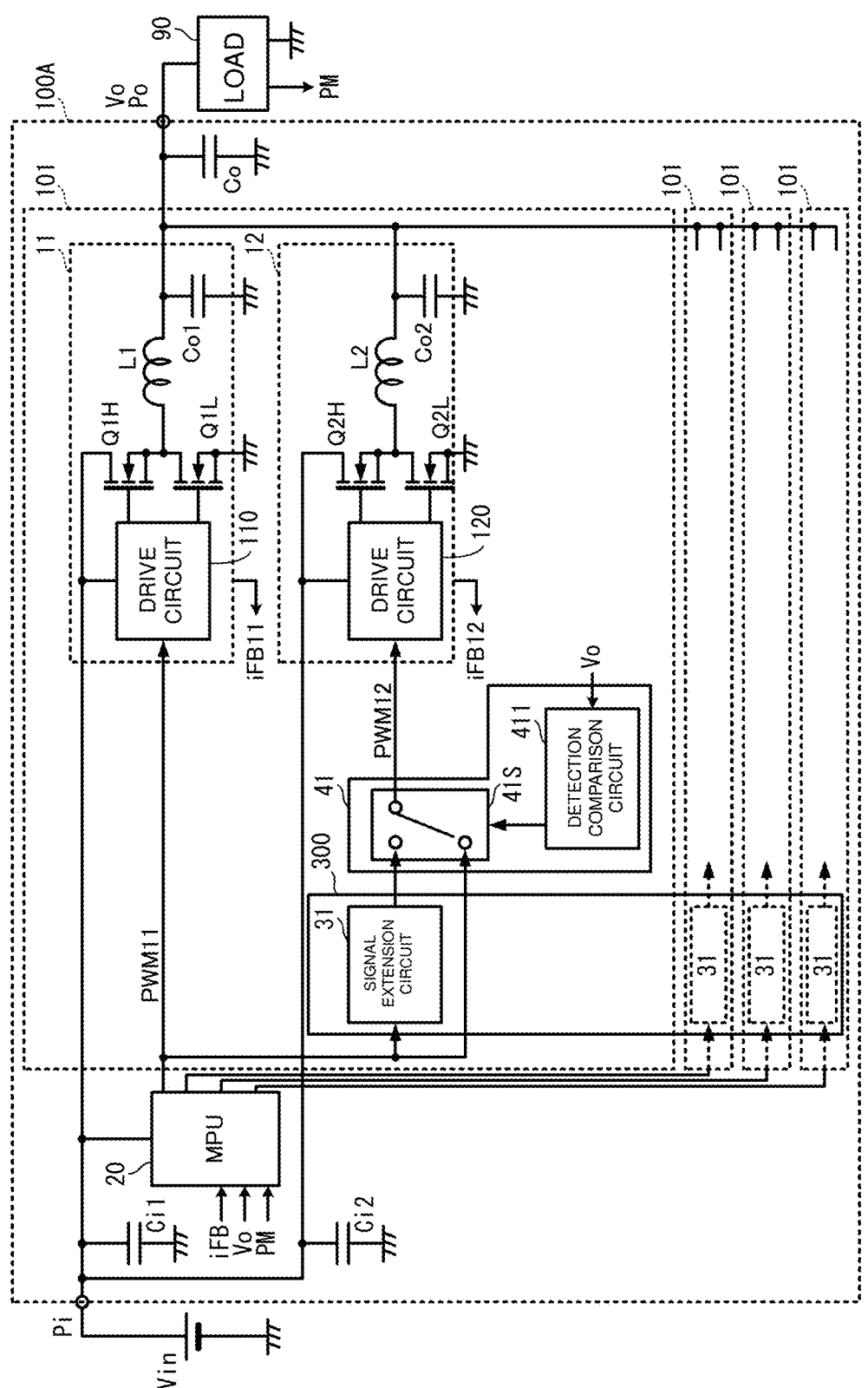
FIG. 7 is a circuit block diagram illustrating an example of a power supply system according to a third embodiment.

A power supply system according to a third embodiment of the present disclosure is described with reference to the drawing. FIG. 7 is a circuit block diagram illustrating an example of the power supply system according to the third embodiment.

As illustrated in FIG. 7, a power supply system 100A according to the third embodiment differs from the power supply system 100 according to the first embodiment in the configuration of the signal extension circuits 31 of the multiple individual power conversion systems 101. Other configurations of the power supply system 100A are the same as those of the power supply system 100, and descriptions of the same configurations are omitted here.

The signal extension circuits 31 of the multiple individual power conversion systems 101 are implemented by one programmable FPGA 300.

With this configuration, the power supply system 100A can provide the same effects as the power supply system 100. Also, with the power supply system 100A, it is possible to accurately set a delay time (phase adjustment) for the PWM drive control signal PWM12 in each of the multiple individual power conversion systems 101. Furthermore, with the power supply system 100A, it is possible to easily set the number of signal extension circuits according to the number of individual power conversion systems 101.

Fourth Embodiment

Figure 8:
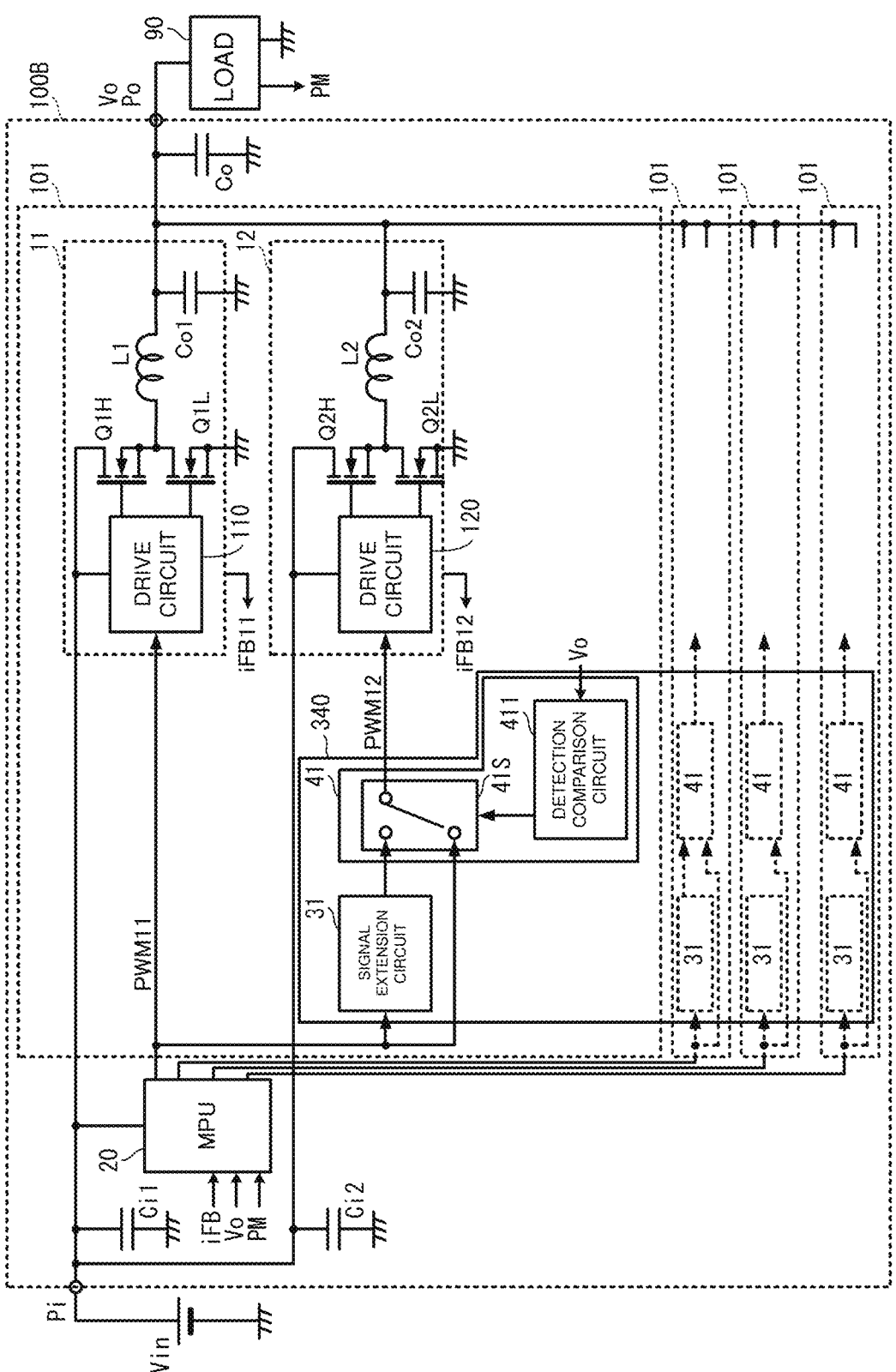
FIG. 8 is a circuit block diagram illustrating an example of a power supply system according to a fourth embodiment.

A power supply system according to a fourth embodiment of the present disclosure is described with reference to the drawing. FIG. 8 is a circuit block diagram illustrating an example of the power supply system according to the fourth embodiment.

As illustrated in FIG. 8, a power supply system 100B according to the fourth embodiment differs from the power supply system 100 according to the first embodiment in the configuration of the signal extension circuits 31 and the low-voltage malfunction prevention circuits 41 of the multiple individual power conversion systems 101. Other configurations of the power supply system 100B are the same as those of the power supply system 100, and descriptions of the same configurations are omitted here.

The signal extension circuits 31 and the low-voltage malfunction prevention circuits 41 of the multiple individual power conversion systems 101 are implemented by one programmable FPGA 340.

With this configuration, the power supply system 100B can provide the same effects as the power supply system 100. Also, with the power supply system 100B, it is possible to accurately set a delay time (phase adjustment) for the PWM drive control signal PWM12 in each of the multiple individual power conversion systems 101. Also, with the power supply system 100B, it is possible to accurately set the switching timing between the transient state and the steady state. Also, with the power supply system 100B, it is possible to easily set the number of signal extension circuits and the number of low-voltage malfunction prevention circuits according to the number of individual power conversion systems 101. Furthermore, because the signal extension circuits 31 and the low-voltage malfunction prevention circuits 41 are implemented by one FPGA, the size of the power supply system 100B can be reduced.

Fifth Embodiment

Figure 9:
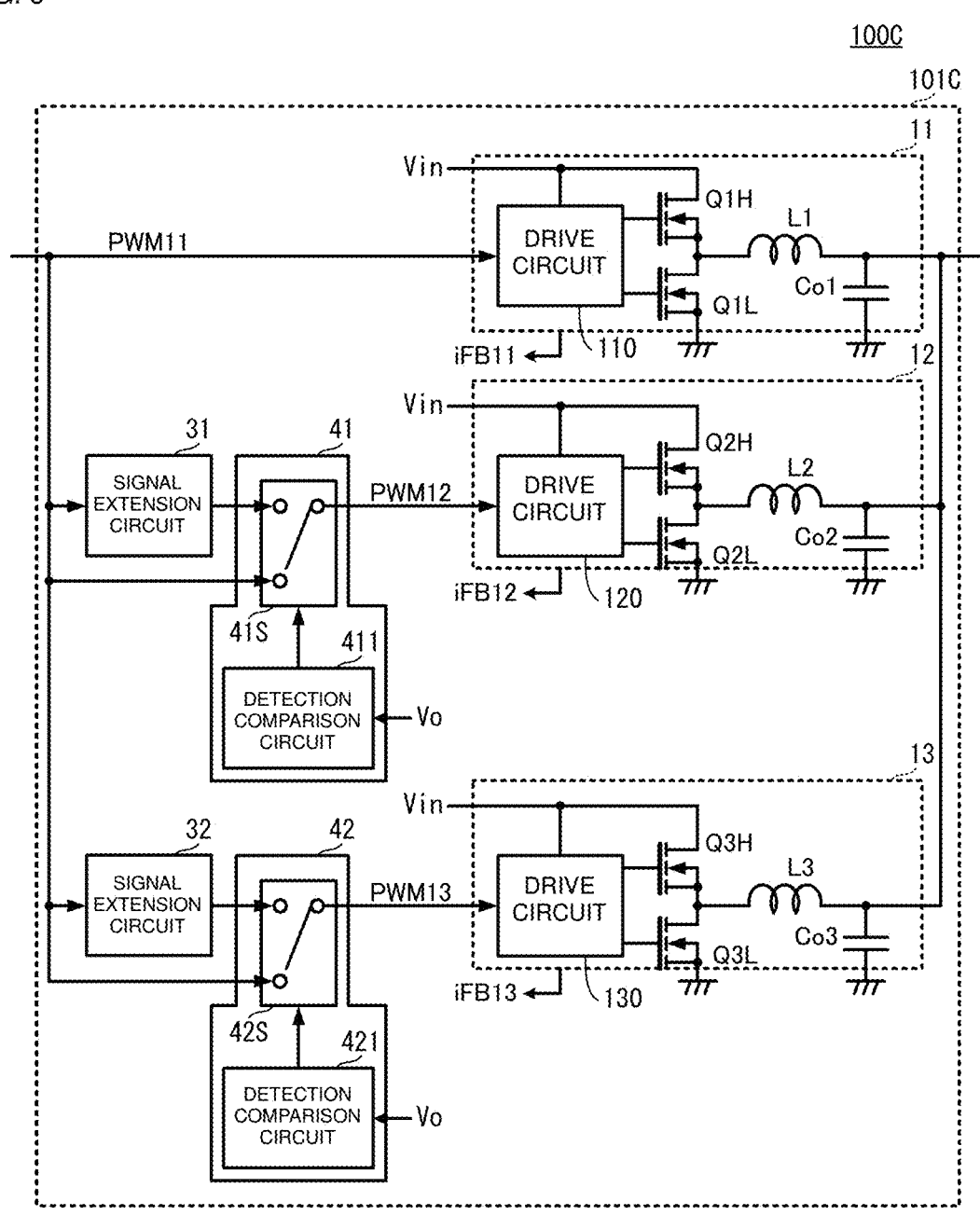
FIG. 9 is a circuit block diagram illustrating an example of a part of a power supply system according to a fifth embodiment.

A power supply system according to a fifth embodiment of the present disclosure is described with reference to the drawing. FIG. 9 is a circuit block diagram illustrating an example of a part of the power supply system according to the fifth embodiment.

As illustrated in FIG. 9, each individual power conversion system 101C of a power supply system 100C according to the fifth embodiment differs from the individual power conversion system 101 of the power supply system 100 according to the first embodiment in that the individual power conversion system 101C includes a power converter circuit 13, a signal extension circuit 32, and a low-voltage malfunction prevention circuit 42. Other configurations of the power supply system 100C are the same as those of the power supply system 100, and the descriptions of the same configurations are omitted here.

The power converter circuit 13 includes a drive circuit 130, a switching element Q3H, a switching element Q3L, an inductor L3, and a capacitor Co3. The basic configuration of the power converter circuit 13 is the same as that of the power converter circuit 12. The power converter circuit 13 corresponds to a "second power converter circuit" of the present disclosure, the drive circuit 130 corresponds to a "second drive circuit" of the present disclosure, and the switching elements Q3H and Q3L correspond to a "second switching element" of the present disclosure.

The input end of the signal extension circuit 32 is connected to the connection line between the MPU 20 and the power converter circuit 11. The output end of the signal extension circuit 32 is connected to the low-voltage malfunction prevention circuit 42. The basic configuration of the signal extension circuit 32 is the same as that of the signal extension circuit 31. However, the amount of delay caused by the signal extension circuit 32 is different from the amount of delay caused by the signal extension circuit 31.

The low-voltage malfunction prevention circuit 42 includes a switch circuit 42S and a detection comparison circuit 421. The switch circuit 42S is connected to the output end of the signal extension circuit 32, the connection line between the MPU 20 and the power converter circuit 11, and the drive circuit 130. The basic configuration of the low-voltage malfunction prevention circuit 42 is the same as that of the low-voltage malfunction prevention circuit 41.

Thus, the individual power conversion system 101C of the power supply system 100C includes two sets of circuitry in each of which a signal extension circuit, a low-voltage malfunction prevention circuit, and a power converter circuit are electrically connected in this order, and the two sets of circuitry are connected in parallel with each other.

With this configuration, the power supply system 100C can provide the same effects as the power supply system 100. Furthermore, with the power supply system 100C, it is possible to increase the number of phases that can be handled by one individual power conversion system 101C.

Sixth Embodiment

Figure 10:
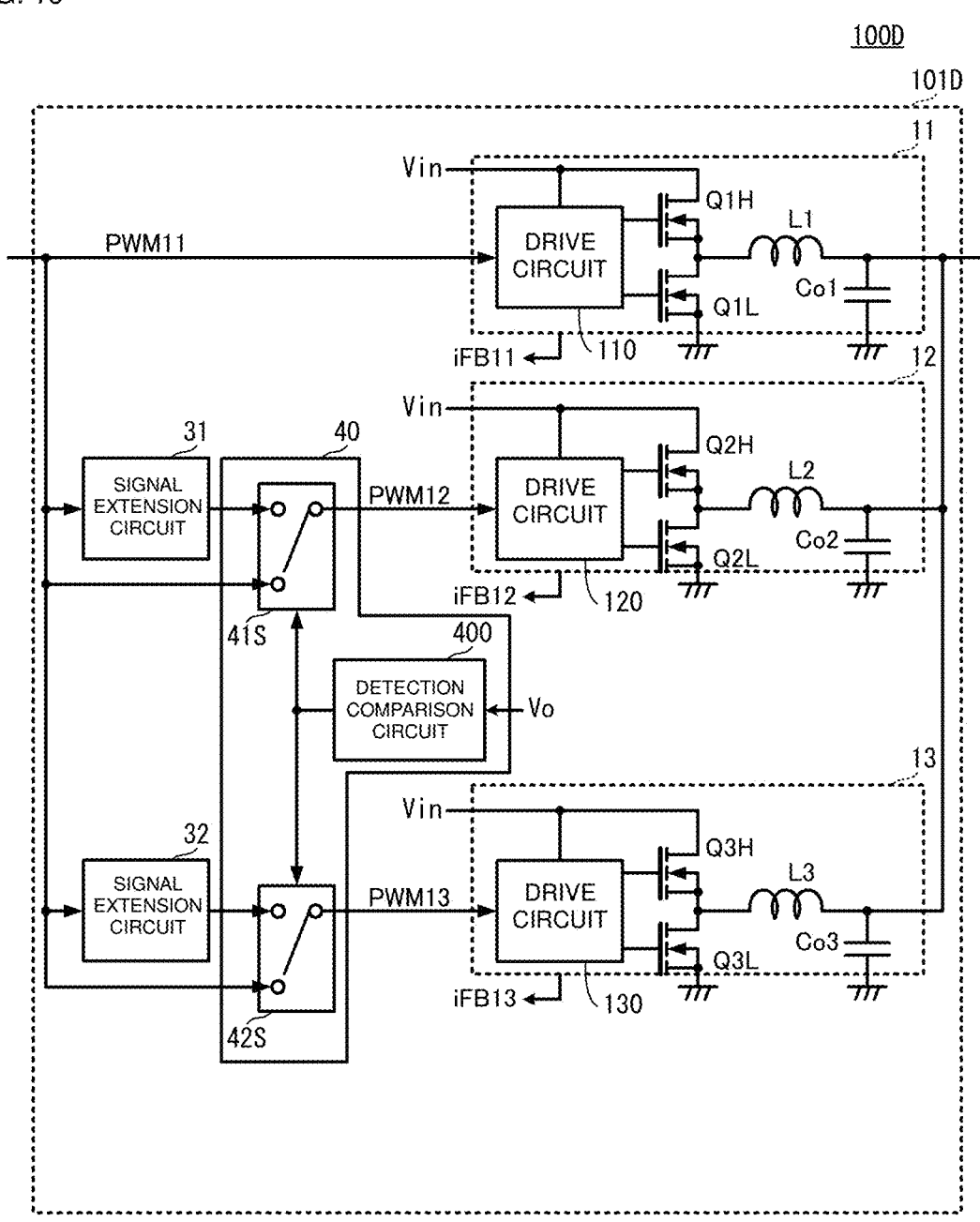
FIG. 10 is a circuit block diagram illustrating an example of a part of a power supply system according to a sixth embodiment.

A power supply system according to a sixth embodiment of the present disclosure is described with reference to the drawing. FIG. 10 is a circuit block diagram illustrating an example of a part of the power supply system according to the sixth embodiment.

As illustrated in FIG. 10, each individual power conversion system 101D of a power supply system 100D according to the sixth embodiment differs from the individual power conversion system 101C of the power supply system 100C according to the fifth embodiment in that the individual power conversion system 101D includes a low-voltage malfunction prevention circuit 40. Other configurations of the individual power conversion system 101D are the same as those of the individual power conversion system 101C, and descriptions of the same configurations are omitted here.

The individual power conversion system 101D includes the low-voltage malfunction prevention circuit 40. The low-voltage malfunction prevention circuit 40 includes a switch circuit 41S, a switch circuit 42S, and a detection comparison circuit 400. The switch circuits 41S and 42S are the same as those of the individual power conversion system 101C described above.

The detection comparison circuit 400 generates a switch control signal PG based on a result of comparison between the output voltage Vo and the threshold value Vth and outputs the switch control signal PG to the switch circuit 41S and the switch circuit 42S.

With this configuration, the power supply system 100D can provide the same effects as the power supply system 100C. Furthermore, the power supply system 100D can be implemented with a smaller and simpler circuit configuration compared with the power supply system 100C.

Each of the individual power conversion system 101C according to the fifth embodiment and the individual power conversion system 101D according to the sixth embodiment includes two sets of circuitry in each of which a signal extension circuit, a low-voltage malfunction prevention circuit, and a power converter circuit are electrically connected in this order. However, the number of sets of the circuitry may be three or more.

The configurations and control methods described in the above embodiments may be combined as appropriate to achieve effects corresponding to the combination.

What is claimed is:

1. A scalable power supply system comprising:

multiple power converter circuits including at least a first power converter circuit including a first inductor, a first switching element configured to control an electric current flowing through the first inductor, and a first drive circuit configured to drive the first switching element, and a second power converter circuit including a second inductor, a second switching element configured to control an electric current flowing through the second inductor, and a second drive circuit configured to drive the second switching element;

an output terminal to which the multiple power converter circuits are connected in parallel with each other such that output currents from the multiple power converter circuits are combined to obtain an output voltage;

a power management control IC device including an external signal function configured to output a first drive signal controlled according to an external signal to the multiple power converter circuits;

a signal extension circuit that is electrically connected between the power management control IC device and the second drive circuit and is configured to output a second drive signal generated by adjusting a phase of the first drive signal; and a low-voltage malfunction prevention circuit that is connected between an input end of the second drive circuit and output ends of the power management control IC device and the signal extension circuit, wherein the first drive signal is a three-state signal having one of a first voltage, a second voltage, and a third voltage in ascending order;

the low-voltage malfunction prevention circuit includes a detection comparison circuit that detects the output voltage and is configured to determine whether the output voltage is less than or equal to a threshold voltage representing a voltage value that is less than a predetermined output voltage;

when the output voltage is less than the threshold voltage, the low-voltage malfunction prevention circuit is configured to output the first drive signal as the second drive signal to the second drive circuit;

when the output voltage is greater than the threshold voltage, the low-voltage malfunction prevention circuit is configured to output, to the second drive circuit, the second drive signal that is obtained by adjusting the phase of the first drive signal with the signal extension circuit; and the multiple power converter circuits are configured to perform a multiphase signal driving operation.

2. The scalable power supply system according to claim 1, wherein the multiple power converter circuits include multiple units of a power converter circuit with a configuration corresponding to the second power converter circuit; and the multiple units of the power converter circuit are configured to be driven based on output signals from the power management control IC device and are connected in parallel with each other such that output currents from the multiple units of the power converter circuit are combined to obtain the output voltage.

3. The scalable power supply system according to claim 2, wherein the power management control IC device includes multiple output ends configured to output the first drive signal; and a power converter circuit configuration corresponding to the first power converter circuit, the low-voltage malfunction prevention circuit, and the second power converter circuit is provided for each of the multiple output ends.

4. The scalable power supply system according to claim 2, wherein the power management control IC device is configured by a multiphase controller semiconductor IC including a digital control circuit.

5. The scalable power supply system according to claim 2, wherein the power management control IC device includes another external signal function that is configured to perform communication with an external device using a PMBus signal.

6. The scalable power supply system according to claim 2, wherein the signal extension circuit is configured by a programmable FPGA.

7. The scalable power supply system according to claim 2, wherein the signal extension circuit is configured by an analog IC.

8. The scalable power supply system according to claim 2, wherein the signal extension circuit and the low-voltage malfunction prevention circuit are configured by a programmable FPGA.

9. The scalable power supply system according to claim 2, wherein the signal extension circuit and the low-voltage malfunction prevention circuit are configured by an analog IC.

10. The scalable power supply system according to claim 1, wherein the power management control IC device includes multiple output ends configured to output the first drive signal; and a power converter circuit configuration corresponding to the first power converter circuit, the low-voltage malfunction prevention circuit, and the second power converter circuit is provided for each of the multiple output ends.

11. The scalable power supply system according to claim 10, wherein the power management control IC device is configured to output multiple first drive signals with different phases.

12. The scalable power supply system according to claim 10, wherein the power management control IC device is configured by a multiphase controller semiconductor IC including a digital control circuit.

13. The scalable power supply system according to claim 10, wherein the power management control IC device includes another external signal function that is configured to perform communication with an external device using a PMBus signal.

14. The scalable power supply system according to claim 10, wherein the signal extension circuit is configured by a programmable FPGA.

15. The scalable power supply system according to claim 1, wherein the power management control IC device is configured by a multiphase controller semiconductor IC including a digital control circuit.

16. The scalable power supply system according to claim 1, wherein the power management control IC device includes another external signal function that is configured to perform communication with an external device using a PMBus signal.

17. The scalable power supply system according to claim 1, wherein the signal extension circuit is configured by a programmable FPGA.

18. The scalable power supply system according to claim 1, wherein the signal extension circuit is configured by an analog IC.

19. The scalable power supply system according to claim 1, wherein the signal extension circuit and the low-voltage malfunction prevention circuit are configured by a programmable FPGA.

20. The scalable power supply system according to claim 1, wherein the signal extension circuit and the low-voltage malfunction prevention circuit are configured by an analog IC.

* * * * *